(No Model.)
W. L. DICKERSON & J. A. TOWNE.
CAR FENDER.
No. 595,095.  Patented Dec. 7, 1897.
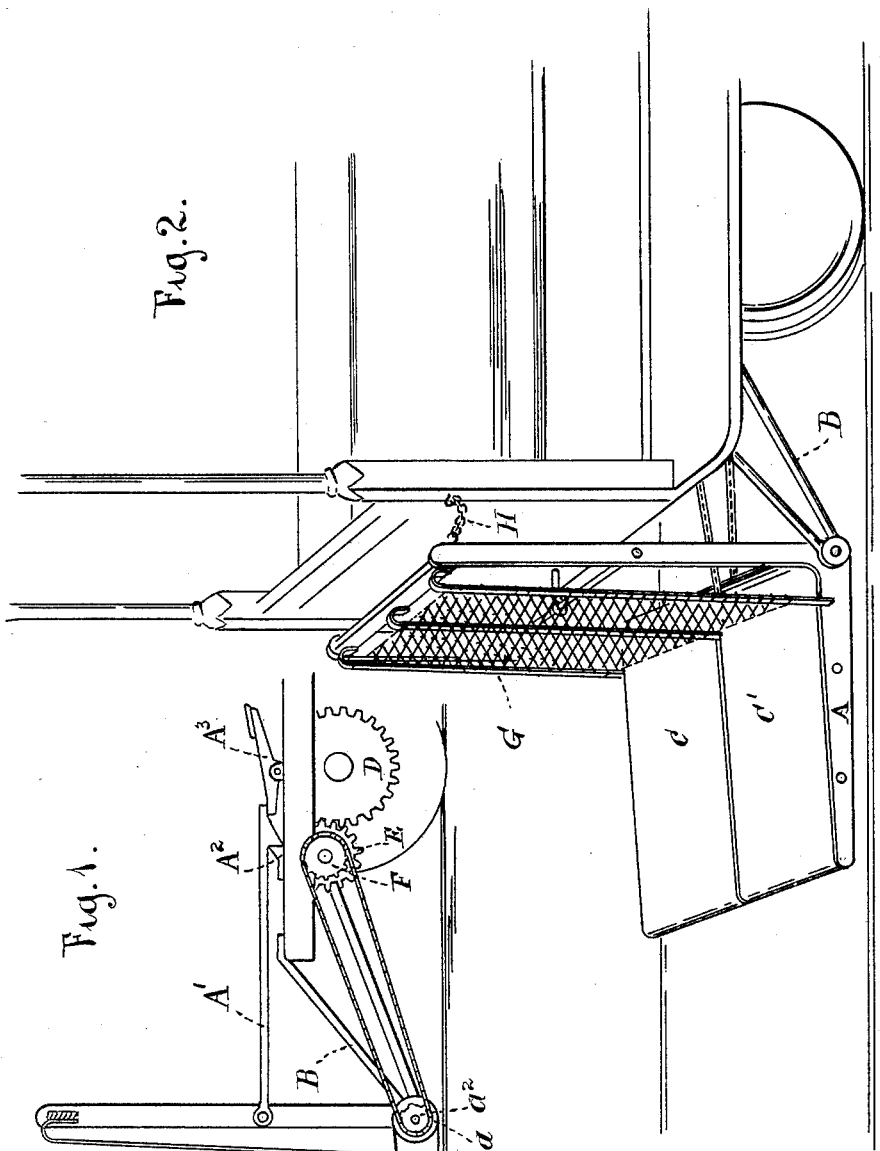

UNITED STATES PATENT OFFICE.

WILLIAM L. DICKERSON AND JOHN A. TOWNE, OF OAKLAND, CALIFORNIA.

CAR-FENDER.

SPECIFICATION forming part of Letters Patent No. 595,095, dated December 7, 1897.

Application filed July 6, 1897. Serial No. 643,634. (No model.)

*To all whom it may concern:*

Be it known that we, WILLIAM L. DICKERSON and JOHN A. TOWNE, citizens of the United States, residing in Oakland, in the county of Alameda and State of California, have invented an Improved Car-Fender, of which the following is a specification.

The invention relates to the class of devices attached to the forward end of street-cars to prevent serious injury to persons accidentally struck thereby.

The object of the invention is to provide a simple, cheap, and effective device of this character whereby injury to persons may be reduced to a minimum. We attain this object by means of the devices illustrated in the accompanying drawings, in which—

Figure 1 shows a sectional elevation of the fore part of the front truck of a street-car, showing our device in position. Fig. 2 shows a perspective view of the front portion of a street-car, showing our fender attached in position.

Referring to the drawings, A is an L-shaped frame pivoted at the angle in suitable brackets B, which are securely attached to the car-truck. Between the sides of the L-shaped frame are two rotatable rolls $a$ and $a'$, journaled in the sides of the frame. Supported upon and driven by these rolls are traveling endless belts C C', of canvas, rubber, or other suitable material, having a smooth or roughened exterior surface. Secured upon the shaft of roll $a$ is a chain sprocket-wheel $a^2$. Upon one of the axles of the forward truck is secured a gear-wheel D, which meshes into and drives a gear-wheel E, suitably journaled in the truck-frame. Upon the same shaft as the last-mentioned gear is secured a chain sprocket-wheel F, which is connected by a driving-chain with the sprocket-wheel $a^2$.

To the upright portion of frame A is attached spring-rods G, preferably secured only at their upper ends. Upon the spring-rods G is secured netting or other yielding covering forming an apron.

Attached to a suitable part of frame A is a latch-bar A', adapted to engage with a lug or catch $A^2$. Upon the truck a pivoted rocking lever $A^3$ is provided, one end of which is adapted to engage with and release the latch-bar A'.

A slack-chain H is provided, one end of which is fastened to the frame A and the other end to the car.

The operation of the devices is as follows: Depressing the free end of the lever $A^3$ throws the latch-bar A' out of engagement with lug $A^2$. The forward end of frame A consequently falls to the extent permitted by the limiting-chain H, thus bringing the forward part of the belts close to the surface of the roadway. The rotation of the car-axle through the described mechanism gives traveling motion toward the car of the upper surface of the belts C C', and thus not only prevents any portion of the person or clothing of the individual struck from passing under the fender but carries them bodily upon the fender. The yielding character of the spring-rods G and the netting prevents injury at this point.

Having now described our invention, what we claim as new, and desire to secure by Letters Patent, is—

In a car-fender an L-shaped frame pivotally secured to the car provided with traveling belts C C' and belt-driving mechanism consisting of the sprocket-wheels $a^2$ and F and driving-chain the gears D and E, the spring-rods G with their yielding webbing the latch-bar A' and releasing device and limiting-chain H all arranged substantially as and for the purpose herein described.

WILLIAM L. DICKERSON.
JOHN A. TOWNE.

Witnesses:
LEE D. CRAIG,
W. A. McKOWEN.